(12) United States Patent
Volny et al.

(10) Patent No.: US 9,932,128 B1
(45) Date of Patent: Apr. 3, 2018

(54) EXTERNAL AIRCRAFT EMERGENCY LIGHTING

(71) Applicant: Goodrich Corporation, Charlotte, NC (US)

(72) Inventors: Jaro S Volny, Scottsdale, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/350,817

(22) Filed: Nov. 14, 2016

(51) Int. Cl.
| | |
|---|---|
| *B64D 47/02* | (2006.01) |
| *B64F 1/20* | (2006.01) |
| *F21V 1/20* | (2006.01) |
| *F21V 21/00* | (2006.01) |
| *B64D 25/14* | (2006.01) |
| *F21V 23/06* | (2006.01) |
| *F21V 17/02* | (2006.01) |
| *F21V 7/00* | (2006.01) |
| *F21V 23/02* | (2006.01) |
| *F21S 9/02* | (2006.01) |

(52) U.S. Cl.
CPC .............. *B64D 47/02* (2013.01); *B64D 25/14* (2013.01); *F21S 9/02* (2013.01); *F21V 7/00* (2013.01); *F21V 17/02* (2013.01); *F21V 23/02* (2013.01); *F21V 23/06* (2013.01)

(58) Field of Classification Search
CPC ......... B64D 47/02; B64D 25/14; F21V 25/00; F21V 17/02
See application file for complete search history.

(56) References Cited

U.S. PATENT DOCUMENTS

| | | | | |
|---|---|---|---|---|
| 3,621,383 A | * | 11/1971 | Rush | B64D 25/14 |
| | | | | 182/48 |
| 5,301,630 A | * | 4/1994 | Genovese | B63B 27/14 |
| | | | | 114/375 |
| 6,142,644 A | * | 11/2000 | Leung | F21V 21/0885 |
| | | | | 362/157 |
| 8,960,940 B2 | | 2/2015 | Hellkamp | |
| 2005/0115794 A1 | * | 6/2005 | Zonneveld | A62B 3/00 |
| | | | | 193/5 |
| 2008/0025026 A1 | * | 1/2008 | Lee | F21S 10/002 |
| | | | | 362/253 |
| 2013/0249435 A1 | * | 9/2013 | Hellkamp | F21L 4/04 |
| | | | | 315/297 |
| 2013/0329439 A1 | * | 12/2013 | Hellkamp | F21V 23/003 |
| | | | | 362/464 |
| 2014/0009274 A1 | * | 1/2014 | Kohlmeier-Beckmann | B64D 25/14 |
| | | | | 340/425.5 |
| 2016/0167795 A1 | | 6/2016 | Kohlmeier-Beckmann | |
| 2016/0171848 A1 | | 6/2016 | Kohlmeier-Beckmann | |

* cited by examiner

*Primary Examiner* — Alexander Garlen
(74) *Attorney, Agent, or Firm* — Snell & Wilmer, L.L.P (57) ABSTRACT

A light assembly for an aircraft evacuation system may comprise a first casing including a weighted portion. A light source may be disposed within the first casing. A second casing may be coupled to the first casing by a bearing. The first casing may be configured to rotate with respect to the second casing about an axis. A center of mass of the first casing may be offset from the axis.

14 Claims, 6 Drawing Sheets

EXTERNAL AIRCRAFT EMERGENCY LIGHTING

FIELD

The present disclosure relates to light systems for aircraft and, more specifically, to external lighting for aircraft evacuation systems.

BACKGROUND

In the event of an aircraft evacuation, evacuation assemblies, such as evacuation slides, may be deployed to safely usher passengers from the aircraft to the ground. Emergency evacuation slides may be used to exit an aircraft absent a jet way or other means of egress for passengers. The slides may deploy from a door sill on a side of the aircraft, for example. The sill height may vary in response to the presence of deployed landing gear, the contour of terrain, a water landing, for example. As the sill height of an aircraft door varies, the slide angle of an evacuation slide may also vary. During night evacuations, slide visibility may be limited. Limited visibility may cause hesitation in passengers and slow their evacuation. Some evacuation slides may include one or more lights affixed to the slide. External aircraft lights are typically fixed to the aircraft. Fixed lighting may not sufficiently illuminate the slide or an evacuation path.

SUMMARY

A light assembly for an aircraft evacuation system is described herein, in accordance with various embodiments. The light assembly may comprise a first casing including a weighted portion. A light source may be disposed within the first casing. A second casing may be coupled to the first casing by a pin. The first casing may be configured to rotate with respect to the second casing about an axis. A center of mass of the first casing may be offset from the axis.

In various embodiments, the light source may include a vertical distribution angle centered at a beam direction. The beam direction may be oriented independently of a position of the second casing. The beam direction may be constant relative to a direction of gravitational force. The weighted portion may be integral with the first casing. The pin may electrically couple the light source to a power source. A damper may be disposed between the first casing and the second casing. The damper may be configured to dampen rotation of the first casing with respect to the second casing. The damper may comprise an optically transmissive liquid.

An evacuation system is also provided. The evacuation system may comprise an evacuation device having a plurality of positions based on a deployment angle of the evacuation device. A light assembly may be coupled to the evacuation device. The light assembly may comprise a first casing including a weighted portion. A light source may be disposed within the first casing. A second casing may be coupled to the evacuation device. The first casing may be coupled to the second casing. The first casing may have a rotational degree of freedom about an axis such that a beam direction is independent of the deployment angle of the evacuation device.

In various embodiments, a center of mass of the first casing may be offset from the axis. The weighted portion may be integral with the first casing. The first casing may be coupled to the second casing by a pin. The pin may electrically couple the light source to a power source. A damper may be disposed between the first casing and the second casing. The damper may be configured to dampen rotation of the first casing with respect to the second casing. The damper may comprise an optically transmissive liquid. The evacuation device may comprise an inflatable slide.

A method of making a light assembly for an evacuation device is also provided. The method may comprise the steps of selecting a beam direction for a light source, disposing the light source within a first casing configured to rotate about an axis, offsetting a center of mass of the first casing with respect to the axis and based on the selected beam direction, and coupling the first casing to a second casing with the first casing having a rotational degree of freedom relative to the second casing.

In various embodiments, the step of offsetting the center of mass of the first casing may further comprise integrally forming a weighted portion with the first casing. The method may further comprise damping rotation of the first casing with respect to the second casing. The method may further comprise the second casing to the evacuation device. The second casing may be disposed in a fixed position with respect to the evacuation device. The evacuation device may comprise an inflatable slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine. With reference to an aircraft evacuation slide, "proximal" refers to a head end, and "distal" refers to a toe end.

The present disclosure relates to lighting for aircraft evacuation systems.

Illumination of an evacuation path is useful during evacuation of an aircraft under low light conditions, such as night evacuations. An aircraft may land on a variety of terrain and in various conditions. In the event an aircraft landing results in a starboard or port side roll of the aircraft, an evacuation device may be oriented at various angles with respect to the landing surface. As disclosed herein, a light assembly may be configured to adjust an aiming direction of a light beam to illuminate an evacuation path. A light assembly may include a rotatable portion configured to passively rotate by the force of gravity in order to aim the light beam toward the evacuation path. Thus, light assembly may illuminate the evacuation path regardless of starboard or port side tilt of the aircraft.

Figure 1A:
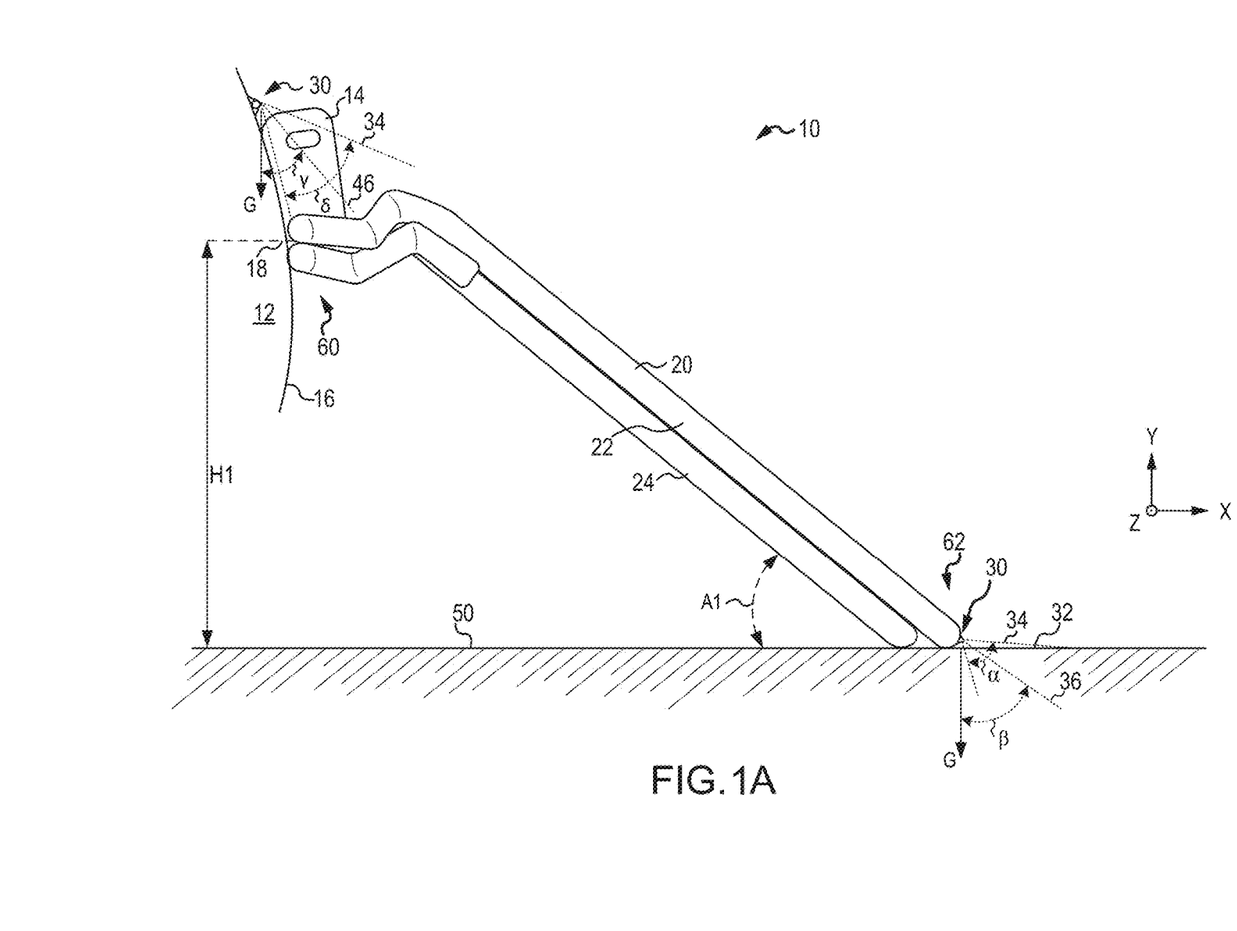
FIGS. 1A and 1B illustrate an emergency evacuation system for an aircraft, in accordance with various embodiments.
Figure 1B:
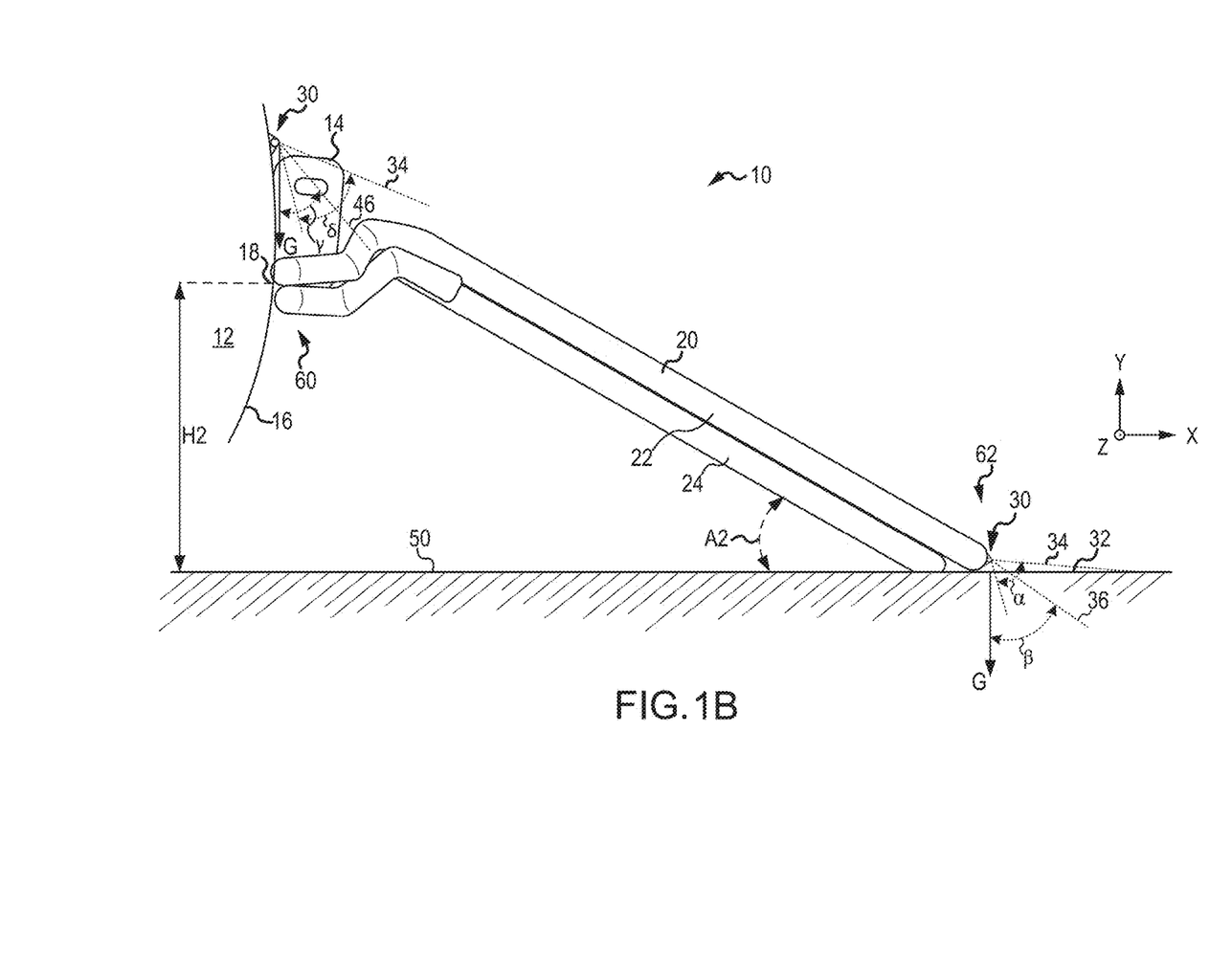

With reference to FIGS. 1A and 1B, a partial front view of an aircraft having an evacuation system is illustrated, in accordance with various embodiments. An evacuation system 10 for an aircraft 12 may comprise an emergency exit door 14 opening from a fuselage 16, and may comprise an evacuation device 20 which may deploy from a door sill 18. Evacuation system 10 may include one or more light assemblies 30, which may be coupled to evacuation device 20 and/or aircraft 12. A light assembly 30 may be configured to illuminate an evacuation device 20 and/or an evacuation area or evacuation path 32. An illumination area 34 of light assembly 30 may have a vertical distribution angle α ("alpha") which may be centered at a line representing the beam direction 36. The beam direction 36 of illumination area 34 may be aimed in at an angle β ("beta") relative to the direction of the force of gravity G, which is directed in the negative y-direction on the provided xyz axes.

Evacuation system 10 may further include additional light assemblies, such as a light assembly 30 mounted to an exterior of aircraft 12, for example, over emergency exit door 14. An illumination area 34 of light assembly 30 may have a vertical distribution angle δ ("delta") which may be centered at a line representing the beam direction 46. The beam direction 46 of illumination area 34 may be aimed in at an angle γ ("gamma") relative to the direction of the force of gravity G, which is directed in the negative y-direction on the provided xyz axes.

Evacuation device 20 of evacuation system 10 may include a slide, a slide raft, a life raft, or other evacuation device, which may be inflatable. Evacuation device 20 may be used for emergency evacuation of an aircraft 12 and may be configured to pack within a compartment of the aircraft 12 (i.e., an aircraft door, a slide bustle, the fuselage, etc.). Evacuation system 10 may deploy the evacuation device 20 in response to an emergency exit door 14 opening. Upon deployment, an inflation source may deliver a pressurized gas to at least partially fill evacuation device 20 with the pressurized gas. In a deployed state, evacuation device 20 may operate as a slide to permit egress of passengers from aircraft 12.

Evacuation device 20 may comprise at least one chamber, such as an upper chamber 22 and/or a lower chamber 24. Upper chamber 22 may include a longitudinal tube extending from a head end or proximal end 60 of evacuation device 20 to a toe end or distal end 62 of inflatable evacuation device 20. Evacuation device 20 may extend from an exit location at an emergency exit door 14 and slope generally radially outward, in the positive x-direction, and downward, in the negative y-direction, and toward an exit surface 50. The exit surface 50 may be ground, water, a runway, uneven terrain or other surface, for example. The proximal end 60 of evacuation device 20 may be secured to aircraft 12, such as by a girt at door sill 18. The distal end 62 of evacuation device 20 may reach exit surface 50. One or more light assemblies 30 may be coupled to distal end 62 of evacuation device 20.

A vertical distance between door sill 18 and exit surface 50 is shown in FIG. 1A as sill height H1. An angle between evacuation device 20 and exit surface 50 is shown in FIG. 1A as deployment angle A1. Depending on the sill height H1, the deployment angle A1 of evacuation device 20 with respect to the exit surface 50 may vary. At various deployment angles of evacuation device 20, light assembly 30 may be configured to provide a constant beam direction and angle relative to vertical (y-direction).

Referring to FIG. 1B, evacuation system 10 may be the same evacuation system 10 illustrated in FIG. 1A but having a lower sill height. For example, in an event a left landing gear of aircraft 12 is damaged and fuselage rolls toward port side, a door sill 18 may be lower than if the left landing gear were intact. In FIG. 1B, a sill height H2, measured as the vertical distance between door sill 18 and exit surface 50, is less than sill height H1 from FIG. 1A. Sill height H2 may be less than sill height H1 as a result of uneven terrain and/or landing gear height, thereby decreasing the distance between door sill 18 and exit surface 50. Similarly, a deployment angle A2, which is an angle between evacuation device 20 and exit surface 50 in FIG. 1B, may be less than deployment angle A1 from FIG. 1A. Light assembly 30 mounted to distal end 62 of evacuation device 20 may be configured to provide the same or substantially the same vertical distribution angle α and angle β of beam direction 36 independent of deployment angles A1, A2 of evacuation device 20. Similarly, light assembly 30 mounted over exit door 14 may be configured to provide the same or substantially the same vertical distribution angle δ and angle γ of beam direction 46 independent of a position of aircraft 12 in the xy plane.

Figure 2:
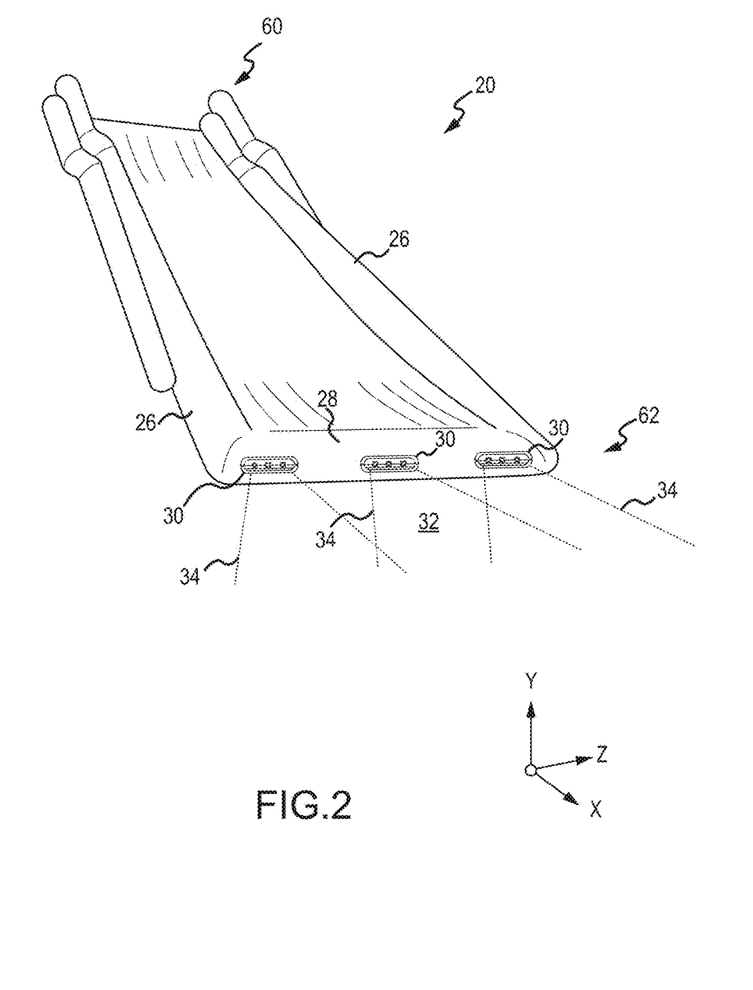
FIG. 2 illustrates a perspective view of the evacuation device from FIGS. 1A and 1B having a light assembly, in accordance with various embodiments.

Referring to FIG. 2, a perspective view of evacuation device 20 from FIGS. 1A and 1B is shown, in accordance with various embodiments. Evacuation device 20 may include a plurality of light assemblies 30 as discussed above and herein. Evacuation device 20 may include may include longitudinal tubes 26 extending from a proximal end 60 of evacuation device 20 to distal end 62 of evacuation device 20. Evacuation device 20 may further include one or more transverse tubes 28 extending between longitudinal tubes 26. Evacuation device 20 may include one or more light assemblies 30 coupled to transverse tube 28 at a distal end 62 of evacuation device 20. Light assemblies 30 may be distributed along transverse tube 28 at intervals depending on the size of evacuation device 20. Light assemblies 30 are oriented to illuminate an evacuation path 32. Light assemblies 30 may be electrically coupled to additional lights on evacuation device 20. Light assemblies 30 may be configured to illuminate a greater area of evacuation path 32 than fixed lighting.

Figure 3A:
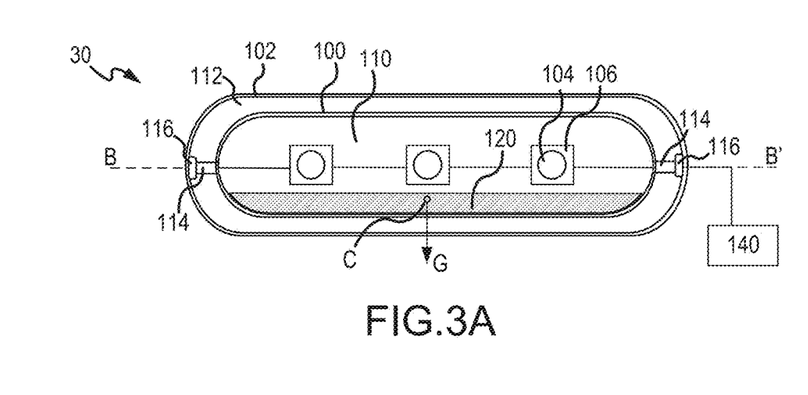
FIGS. 3A and 3B illustrate various light assembly configurations, in accordance with various embodiments.
Figure 3B:
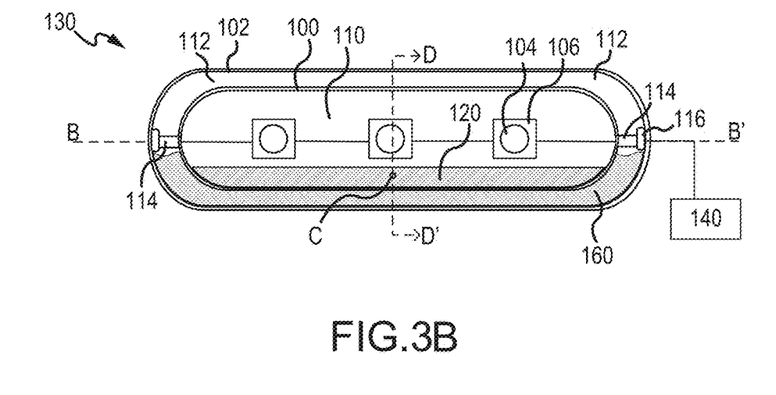

Referring to FIGS. 3A and 3B, light assemblies for an evacuation system 10 are shown, in accordance with various embodiments. A light assembly 30 for an aircraft evacuation system 10 (of FIGS. 1A and 1B) may include a first casing 100 coupled to a second casing 102 with first casing 100 having a rotational degree of freedom relative to second casing 102. First casing 100 may have a rotational degree of freedom about an axis B-B'. Light assembly 30 may include one or more light sources 104 coupled to a rotatable portion of light assembly 30, such as first casing 100. First casing 100 may define a first chamber 110, which may be an inner chamber. A light source 104 may be disposed within first chamber 110 of first casing 100. Light source 104 may be light emitting diode (LED), phosphorescent light, incandescent light, halogen light, florescent light, light strip, or any other suitable light source. For example, light assembly 30 may include a plurality or an array of lights or light sources 104. Light assembly 30 may further include one or more reflectors 106, which may direct the distribution angle and/or beam direction of a light beam from a light source 104.

Second casing 102 may define a second chamber 112, which may be an outer chamber, and first casing 100 may be disposed within second chamber 112. First casing 100 and second casing 102 may each have a cylindrical shape. First casing 100 and second casing 102 may comprise an optically transmissive material, such as a clear plastic or polymer, a transparent material, a translucent material and/or any other suitable material. Transparent materials may include materials that have a light transmission rate of greater than 90%. Translucent materials may include materials having a light transmission rate of greater than 20%.

In various embodiments, first casing 100 may be coupled to second casing 102 by one or more pins 114 and/or one or more bearings 116 allowing a rotational degree of freedom of first casing 100. For example, a pin 114 may be coupled to first casing 100, and further, may rotate with respect to a bearing 116 coupled to second casing 102. A pin 114 and/or bearing 116 may be disposed at each end of first casing 100. Pins 114 and/or bearings 116 may operate as a fulcrum for rotation of first casing 100. First casing 100 may be configured to rotate with respect to second casing 102 about an axis B-B'. Thus, first casing 100 may be axially coupled to second casing 102 and may be configured with at least one rotational degree of freedom relative to second casing 102.

In various embodiments, first casing 100 may include a weighted portion 120. Weighted portion 120 may be a formed integrally with first casing 100 or may be a separate component coupled to first casing 100. Weighted portion 120 may operate to offset a center of gravity C of first casing 100 with respect to axis B-B', which may be an axis of rotation for first casing 100. By offsetting a center of gravity C of first casing 100, the first casing 100, and thus light source 104, may be self-positioning within second casing 102. The force of gravity G acts upon first casing 100 which causes first casing 100 to rotate until its center of gravity C reaches an equilibrium. A position of weighted portion 120 is selected such that an equilibrium point of the center of gravity C of first casing 100 results in a desired beam direction of light source 104.

One or more light sources 104 of light assembly 30 may be in electrical communication with a power source 140. One or more pins 114 and/or one or more bearings 116 may electrically couple light source 104 to power source 140. For example, pin 114 may make electrical contact with bearing 116, which may be electrically coupled by wiring to power source 140. Pin 114 may make electrical contact with wiring coupled to power source 140. Thus, pin 114 may be configured to electrically couple light source 104 to power source 140. In various embodiments, light sources 104 may be powered by one or more power sources 140 such as a battery, solar cell, or generator. Light sources 104 may be powered by wires electrically coupled to a power source 140. Light sources 104 may be wired in series or in parallel to power multiple light sources 104 or multiple light assemblies 30, 130 with a single power source 140. Light sources 104 may also be self-contained and powered by an individual battery for each light source 104.

Referring to FIG. 3B, a light assembly 130 for an evacuation system 10 is shown, in accordance with various embodiments. Light assembly 130 may be similar to light assembly 30 from FIG. 3A, and may further include a damper 160. Damper 160 may operate to mechanically damp the rotation of first casing 100 with respect to second casing 102. Damper 160 may include a material disposed within second casing 102 and between second casing 102 and first casing 100. In various embodiments, damper 160 may include a liquid, an optically transmissive liquid, such as water, an optically transmissive gel or other suitable material. In various embodiments, damper 160 may include a mechanical damper coupled to pins 114 and/or a bearing 116 or coupled to first casing 100.

Figure 4:
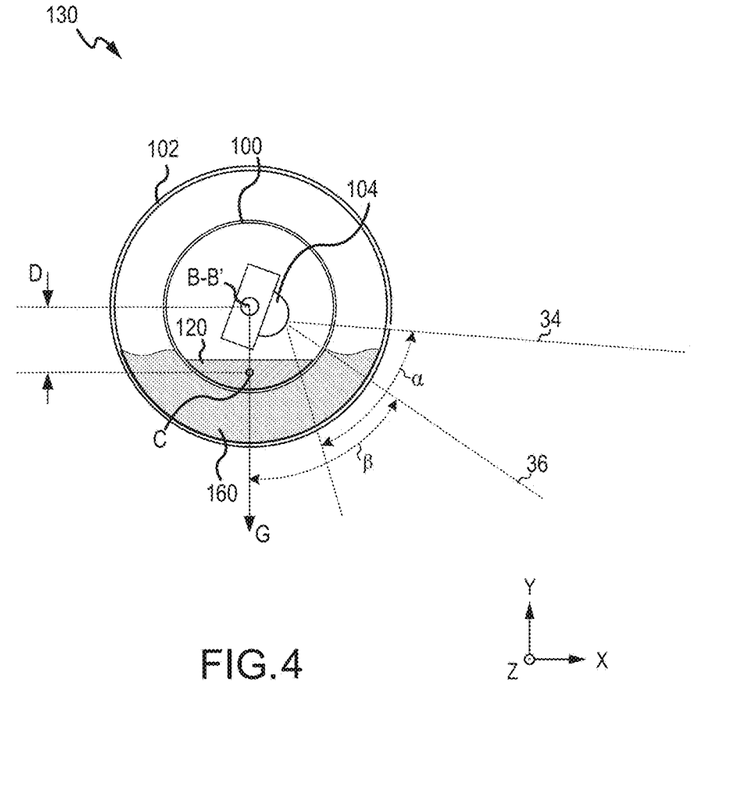
FIG. 4 illustrates a cross-sectional view of a light assembly taken along line D-D' in FIG. 3B, in accordance with various embodiments.

Referring to FIG. 4, a cross-sectional view of a light assembly 130 taken along line D-D' in FIG. 3B is shown, in accordance with various embodiments. Second casing 102 of light assembly 130 may be coupled to an aircraft 12 or evacuation device 20 (see FIGS. 1A and 1B). Second casing 102 may be disposed in a fixed position on aircraft 12 or evacuation device 20, and thus, a position of second casing 102 may be determined by a position of aircraft 12 or evacuation device 20. First casing 100 may be configured to rotate with respect to second casing 102 about axis B-B' in the xy plane. A weighted portion 120 offsets the center of gravity C of first casing 100 by a distance D. As a position of second casing 102 changes within the xy plane, first casing 100 rotates due to the force of gravity G acting upon the center of gravity C of first casing 100. The center of gravity C of first casing 100 will tend to rotate first casing 100 toward a position where center of gravity C is vertically below axis B-B'. Thus, a rotational position of first casing 100 in the xy plane may be independent of a position of second casing 102.

A beam direction 36 of light source 104 may be selected according to a designed illumination area 34. Weighted portion 120 may be configured such that the center of gravity C of first casing 100 is at an equilibrium when beam direction 36 is at the selected angle, i.e. angle $\beta$. Damper 160 disposed between first casing 100 and second casing 102 may reduce the rotational speed of first casing 100, and may allow the center of gravity C of first casing 100 to reach an equilibrium without excessive rotations.

Figure 5:
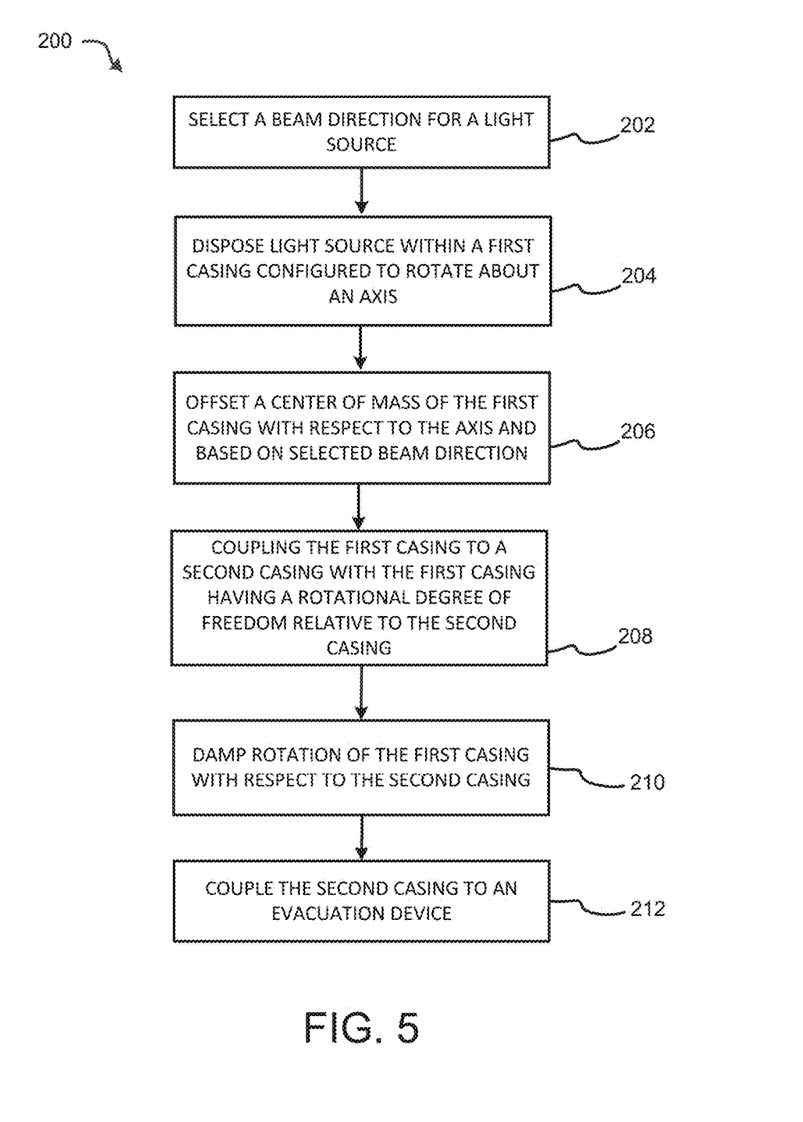
FIG. 5 illustrates a method of making a light assembly for an evacuation system, in accordance with various embodiments.

Referring to FIG. 5, a method 200 of making a light assembly for an evacuation device or evacuation system is shown, in accordance with various embodiments. Method 200 may comprise the steps of selecting a beam direction for a light source (step 202), disposing the light source within a first casing configured to rotate about an axis (step 204), offsetting a center of mass of the first casing with respect to the axis and based on the selected beam direction (step 206), coupling the first casing to a second casing with the first casing having a rotational degree of freedom relative to the second casing (step 208), damping rotation of the first casing with respect to the second casing (step 210), and coupling the second casing to an evacuation device (step 212).

Step 202 may further comprise selecting the beam direction 36 based on an evacuation path 32 to be illuminated. The beam direction 36 may be oriented independently of a position of the second casing 102. Step 206 may further comprise coupling a weight to the first casing 100. Step 206 may further comprise integrally forming a weighted portion 120 with the first casing 100. Step 208 may further comprise axially coupling the first casing 100 to the second casing 102 with a pin 114 or a bearing 116 to allow a rotational degree of freedom for the first casing 100 relative to the second casing 102. Step 210 may further comprise disposing an optically transmissive liquid between the first casing 100 and the second casing 102. The damper may be configured to dampen rotation of the first casing 100 with respect to the second casing. Step 212 may further comprise electrically coupling the light source 104 to a power source 140. The method may further include electrically coupling the light source 104 to the first casing 100 and electrically coupling the first casing 100 to the power source 140 through the pin 114 or the bearing 116.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A light assembly for an aircraft evacuation system, comprising:
   a first casing including a weighted portion;
   a light source disposed within the first casing;
   a second casing coupled to the first casing by a pin, the first casing configured to rotate with respect to the second casing about an axis, wherein a center of mass of the first casing is offset from the axis; and
   a damper comprising an optically transmissive liquid disposed between the first casing and the second casing, the damper configured to dampen rotation of the first casing with respect to the second casing.

2. The light assembly of claim 1, wherein the light source includes a vertical distribution angle centered at a beam direction, wherein the beam direction is oriented independently of a position of the second casing.

3. The light assembly of claim 2, wherein the beam direction is constant relative to a direction of gravitational force.

4. The light assembly of claim 1, wherein the pin electrically couples the light source to a power source.

5. The light assembly of claim 1, wherein the weighted portion is integral with the first casing.

6. An evacuation system, comprising:
   an evacuation device having a plurality of positions based on a deployment angle of the evacuation device; and
   a light assembly coupled to the evacuation device, the light assembly comprising:
   a first casing including a weighted portion,
   a light source disposed within the first casing,
   a second casing coupled to the evacuation device, the first casing coupled to the second casing, wherein the first casing has a rotational degree of freedom about an axis such that a beam direction is independent of the deployment angle of the evacuation device; and wherein a center of mass of the first casing is offset from the axis; and
   an optically transmissive liquid damper disposed between the first casing and the second casing, the damper configured to dampen rotation of the first casing with respect to the second casing.

7. The evacuation system of claim 6, wherein the weighted portion is integral with the first casing.

8. The evacuation system of claim 6, wherein the first casing is coupled to the second casing by a pin.

9. The evacuation system of claim 8, wherein the pin electrically couples the light source to a power source.

10. The evacuation system of claim 6, wherein the evacuation device comprises an inflatable slide.

11. A method of making a light assembly for an evacuation device, comprising:
- selecting a beam direction for a light source;
- disposing the light source within a first casing configured to rotate about an axis;
- offsetting a center of mass of the first casing with respect to the axis and based on the selected beam direction;
- coupling the first casing to a second casing with the first casing having a rotational degree of freedom relative to the second casing; and
- damping rotation of the first casing with respect to the second casing utilizing an optically transmissive liquid damper disposed between the first casing and the second casing.

12. The method of claim 11, wherein the offsetting the center of mass of the first casing further comprises integrally forming a weighted portion with the first casing.

13. The method of claim 11, further comprising coupling the second casing to the evacuation device, the second casing disposed in a fixed position with respect to the evacuation device.

14. The method of claim 13, wherein the evacuation device comprises an inflatable slide.

* * * * *